United States Patent Office 2,732,394
Patented Jan. 24, 1956

2,732,394

MANUFACTURE OF DIALKYL ARYL PHOSPHATES

Harold Coates, Birmingham, England, assignor to Albright & Wilson Limited, Birmingham, England, a British company No Drawing. Application August 13, 1951,
Serial No. 241,686

Claims priority, application Great Britain August 16, 1950

6 Claims. (Cl. 260—461)

This invention is for improvements in or relating to the manufacture of dialkyl aryl phosphates and has for an object to provide a new and improved process.

The usual processes for the preparation of compounds of this type are the reaction of phosphorus oxychloride with a phenol to give an aryl dichlorophosphonite which is then reacted with an aliphatic alcohol or alkali metal alcoholate, or, alternatively, the reaction of phosphorus trichloride with three moles of an aliphatic alcohol to produce a dialkyl phosphonate (phosphite) followed by chlorination and subsequent reaction of the dialkyl chlorophosphonate with a phenol or alkali phenoxide to produce the corresponding dialkyl aryl phosphate.

It has been shown (Atherton, Openshaw & Todd, Journal of the Chemical Society 1945, 660; Atherton, Todd, ibid, 1947, 674) that this chlorination step may be avoided by the use of carbon tetrachloride or other suitable polyhalogenated hydrocarbon in the presence of a tertiary base in the production of a trialkyl phosphate in accordance with the following equation in which R, R' and R'' are alkyl groups:

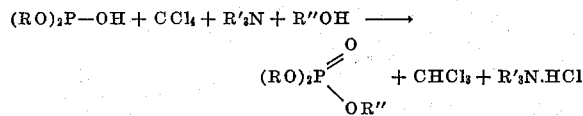

This process, however, has the disadvantage that it requires the use of an organic tertiary base, which is usually expensive and entails the use of some form of recovery process for said tertiary base.

I have found that I can apply the above method to the production of dialkyl aryl phosphates whilst avoiding the use of a tertiary base and that I can obtain the required dialkyl aryl phosphates in good yield and in a very convenient manner by the use, instead of the tertiary base, of inorganic bases, for example alkaline earth metal carbonates, oxides and hydroxides, or alkali metal carbonates, oxides or hydroxides.

According to the present invention, therefore, there is provided a process for the manufacture of dialkyl aryl phosphates which comprises reacting a dialkyl phosphonate with a phenol in the presence of a carbonate, oxide or hydroxide of an alkali metal or alkaline earth metal, and with a polyhalogenated hydrocarbon selected from the following compounds, namely, carbon tetrachloride, carbon tetrabromide, trichlorobromethane, bromodichloromethane, bromoform, hexachloroethane, and pentachloroethane. The phenol may have one or more substituents in the nucleus, for example a nitro- or chloro-substituent and the use of p-nitrophenol is especially useful as there may be produced, from diethyl phosphonate, the valuable insecticide known as E. 600 or paraoxon, diethyl paranitrophenyl phosphate.

The following examples illustrate the manner in which the invention may be carried into effect:

*Example 1.*—To a mixture of diethyl phosphonate (50 gms.) and barium oxide (27.1 gms.) was added carbon tetrachloride (60 gms.) and p-nitrophenol (51 gms.) with vigorous stirring. Reaction started immediately and the temperature was kept below 40° C. by water cooling. After stirring overnight, the mixture was poured into cold water (2 litres), the heavy oil which separated was removed, and the aqueous layer extracted with ether, combined with the oil, and the mixture washed with dilute caustic soda solution, dried over $Na_2SO_4$ and the solvent removed. This consisted of the ether used for the extraction, chloroform formed in the reaction and unreacted $CCl_4$. Distillation of the oily residue gave substantially pure diethyl p-nitrophenyl phosphate, B. P. 145–160° C./0.05–0.2 mm. in 61% yield.

*Example 2.*—An experiment carried out as in Example 1 but using 90 gms. carbon tetrachloride instead of the 60 gms. used in that example gave diethyl p-nitrophenyl phosphate in 60% yield.

*Example 3.*—An experiment carried out as in Example 1 using 40 gms. of diethyl phosphonate, 8.3 gms. of calcium oxide, 60 cc. of $CCl_4$ and 41.5 gms. of p-nitrophenol and keeping the temperature below 50° C. by water cooling, gave substantially pure diethyl p-nitrophenyl phosphate in 42% yield.

*Example 4.*—Diethyl phosphonate (40 gms.) was added to a well-stirred mixture of barium oxide (23 gms.), carbon tetrachloride (90 cc.), and p-nitrophenol (40.5 gms.), keeping the temperature about 40° C. by means of water cooling. The mixture was stirred for 36 hours at room temperature and worked up as in Example 1, giving diethyl p-nitrophenyl phosphate in 81% yield. It will be noted that this reversal of the order of addition of the reactants has led to an increased yield.

*Example 5.*—$Ba(OH)_2.8H_2O$ instead of the barium oxide used in Example 4 gave no product at all by the technique of Example 1 but when the experiment was carried out as in Example 4 then a yield of 21% was obtained.

*Example 6.*—An experiment carried out as in Example 4, but using powdered caustic soda (13.0 gms.) in place of the barium oxide gave a yield of 69%.

*Example 7.*—An experiment carried out as in Example 5, using anhydrous $Na_2CO_3$ (32 gms.) instead of the barium oxide gave a yield of 86%.

*Example 8.*—Diethyl phosphonate (80 gms.) was added slowly to a stirred mixture of phenol (56.6 gms.), carbon tetrachloride (180 cc.), and barium oxide (46 gms.) and the temperature was maintained at 30° C. by strong cooling. (If all the phosphonate is added in one batch the reaction becomes very violent.) After stirring for 24 hours and working up as usual diethyl phenyl phosphate was obtained, B. P. 118° C./0.1 mm. in a yield of 58%.

*Example 9.*—Diethyl phosphonate (30 gms.) was added quickly to a stirred mixture of p-nitrophenol (30.5 gms.), carbon tetrabromide (100 gms.) and anhydrous sodium carbonate (25 gms.). The mixture was cooled by immersion of the vessel containing it in a bath at about −40° C. Very vigorous reaction began almost immediately with evolution of carbon dioxide and stirring was continued until reaction ceased. After working up in the usual manner, diethyl p-nitrophenyl phosphate was obtained, B. P. 150°–154°/0.2–0.3 mm., in a yield of 81%.

The absence of yield when $Ba(OH)_2.8H_2O$ is used in the technique of Example 1 (see Example 5) is believed to be due to the hydrolysis of the diethyl phosphonate by the combined water associated with the barium hydroxide whereas, when the technique of Example 4 was employed, the desired reaction apparently takes place before complete hydrolysis can occur.

I claim:

1. A process for the manufacture of dialkyl aryl phosphates which comprises reacting under substantially anhydrous conditions a lower dialkyl phosphonate with a mononuclear phenol in the presence of an inorganic base selected from the group consisting of carbonates, oxides and hydroxides of alkali metals and alkaline earth metals and with a polyhalogenated hydrocarbon selected from the group consisting of carbon tetrachloride, carbon tetrabromide, trichlorobromomethane, bromodichloromethane, bromoform, hexachloroethane and pentachloroethane.

2. A process according to claim 1 wherein said phenol has a single nitro-substituent in the nucleus.

3. A process according to claim 1 wherein said phenol has a single chloro-substituent in the nucleus.

4. A process according to claim 1 wherein said phenol is p-nitrophenol and said dialkyl phosphonate is diethyl phosphonate.

5. A process according to claim 1 wherein said phenol is p-nitrophenol, said dialkyl phosphonate is diethyl phosphonate and said polyhalogenated hydrocarbon is carbon tetrachloride.

6. A process according to claim 5 wherein the temperature of reaction is maintained at below about 50° C. by external cooling.

References Cited in the file of this patent

UNITED STATES PATENTS 2,520,393    Fletcher _____ Aug. 29, 1950

OTHER REFERENCES

Atherton: J. Chem. Soc. (London) 1947, pp. 674 to 678.

Toy: J. Am. Chem. Soc., vol. 70, pp. 3882, 3883 (1948).

Coates: Ann. Applied Biology, vol. 36 (1949), pp. 156–9.

Topley: Chemistry & Industry, Dec. 30, 1950, p. S–864.

Kosolapoff: Organophosphorus Compounds, p. 227 (1950).